US006986963B2

(12) United States Patent
Evans et al.

(10) Patent No.: US 6,986,963 B2
(45) Date of Patent: Jan. 17, 2006

(54) METALLIZATION OF BACTERIAL CELLULOSE FOR ELECTRICAL AND ELECTRONIC DEVICE MANUFACTURE

(75) Inventors: Barbara R. Evans, Oak Ridge, TN (US); Hugh M. O'Neill, Knoxville, TN (US); Valerie Malyvanh Jansen, Memphis, TN (US); Jonathan Woodward, Knoxville, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 157 days.

(21) Appl. No.: 10/017,202

(22) Filed: Dec. 14, 2001

(65) Prior Publication Data
US 2003/0113610 A1 Jun. 19, 2003

(51) Int. Cl.
H01M 4/86 (2006.01)
H01M 8/16 (2006.01)

(52) U.S. Cl. .............. 429/42; 429/33; 429/30; 429/2

(58) Field of Classification Search .......... 429/2, 429/30, 40, 41, 44, 42, 33; 502/101
See application file for complete search history.

(56) References Cited

U.S. PATENT DOCUMENTS

| | | | |
|---|---|---|---|
| 4,378,431 A | 3/1983 | Brown, Jr. | |
| 4,742,164 A | 5/1988 | Iguchi et al. | |
| 4,863,565 A | 9/1989 | Johnson et al. | |
| 4,912,049 A | 3/1990 | Farah | |
| 4,919,753 A | 4/1990 | Johnson et al. | |
| 4,942,128 A | 7/1990 | Brown, Jr. | |
| 4,960,763 A | 10/1990 | Stephens et al. | |
| 5,079,162 A | 1/1992 | Ben-Bassat et al. | |
| 5,160,418 A | 11/1992 | Mullen | |
| 5,207,826 A * | 5/1993 | Westland et al. ........ | 106/162.5 |
| 5,290,830 A | 3/1994 | Tung et al. | |
| 5,624,537 A | 4/1997 | Turner et al. | |
| 5,863,672 A | 1/1999 | Ledjeff et al. | |
| 5,871,978 A | 2/1999 | Ben-Bassat et al. | |
| 5,955,326 A | 9/1999 | Bungay, III et al. | |
| 5,962,277 A | 10/1999 | Watanabe et al. | |
| 5,962,278 A | 10/1999 | Tsuchida et al. | |
| 6,017,740 A | 1/2000 | Kouda et al. | |
| 6,060,289 A | 5/2000 | Ishihara et al. | |
| 6,071,727 A | 6/2000 | Bungay et al. | |
| 6,087,032 A | 7/2000 | Yoshitake et al. | |
| 6,248,469 B1 | 6/2001 | Formato et al. | |
| 2002/0096279 A1 * | 7/2002 | Kinsley ................ | 162/152 |

FOREIGN PATENT DOCUMENTS

WO WO 89/12107 A1 12/1989

OTHER PUBLICATIONS

Hon, D. N.-S., Cellulose: a random walk along its historical path., Cellulose 1:1-25 (1994), no specific date (month).

Franz G., and W. Blaschek, Cellulose. In Methods in Plant Biochem. vol. 2, Chapter 8, P. M. Dey and J. B. Harborne, editors. Academic Press, London, 291-322 (1990), no specific date (month).

Hestrin, S., Ashner, M., and Mager, J., Synthesis of Cellulose by Resting Cells of *Acetobacter xylinum*. Nature 159: 64-65 (1947), no specific date (month).

Hestrin, S., and Schramm, M., "Synthesis of cellulose by *Acetobacter xylinum*: Preparation of freeze-dried cells capable of polymerizing glucose to cellulose", Biochem. J. 58: 345-352 (1954), no specific date (month).

Cannon, R. E., and Anderson, S. M., Biogenesis of Bacterial Cellulose. Crit. Reviews in Microbiol. 17(6): 435-447 (1991), no specific date (month).

Technology and Livelihood Resource Center, Makati City, Phillipines, available at (Jun. 2000).

Fontana, J. D., De Souza, A. M., Fontana, C. K., Torriani, I. L., Moreschi, J. C., Gallotti, B. J., De Souza, S. J., Narcisco, G. P., Bichara, J. A., and Farah, L. F. X., *Acetobacter* Cellulose Pellicule as a Temporary Skin Substitute. Appl. Biochem. Biotech. 24/25: 253-264 (1990), no specific date (month).

Brown, R. Malcolm, Jr., Experimental Induction of Altered Nonmicrofibrillar Cellulose. Science 218: 1141-1142 (1982), no specific data (month).

Lassig, J. P., Shultz, M. D., Gooch, M. G., Evans, B. R., and Woodward, J., "Inhibition of Cellobiohydrolase I from *Trichoderma reesei* by Palladium", Arch. Biochem. Biophys. 322:119-126 (1995), no specific date (month).

Shultz, M. D., Lassig, J. P., Gooch, M. G., Evans, B. R., and Woodward, J., Palladium—a new inhibitor of cellulase activity. 1995. Biochem. Biophys. Res. Comm. 209: 1046-1052 (1995), no specific date (month).

* cited by examiner

Primary Examiner—Raymond Alejandro
(74) *Attorney, Agent, or Firm*—Quarles & Brady LLP

(57) ABSTRACT

The employment of metallized bacterial cellulose in the construction of fuel cells and other electronic devices is disclosed. The fuel cell includes an electrolyte membrane comprising a membrane support structure comprising bacterial cellulose, an anode disposed on one side of the electrolyte membrane, and a cathode disposed on an opposite side of the electrolyte membrane. At least one of the anode and the cathode comprises an electrode support structure comprising bacterial cellulose, and a catalyst disposed in or on the electrode support structure.

10 Claims, 4 Drawing Sheets

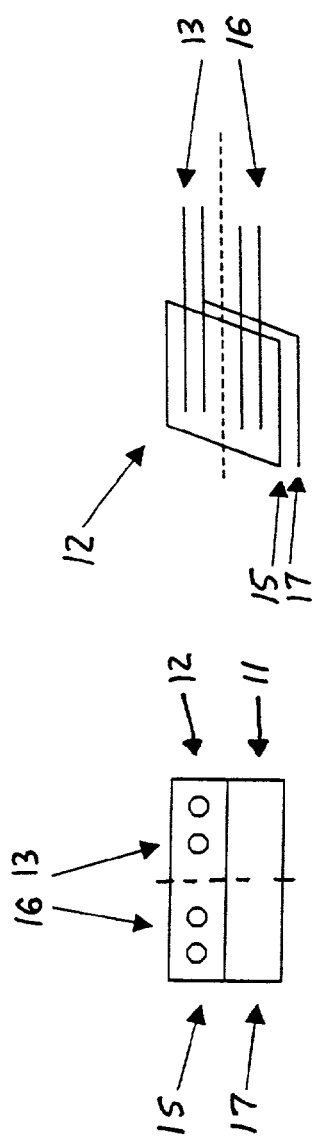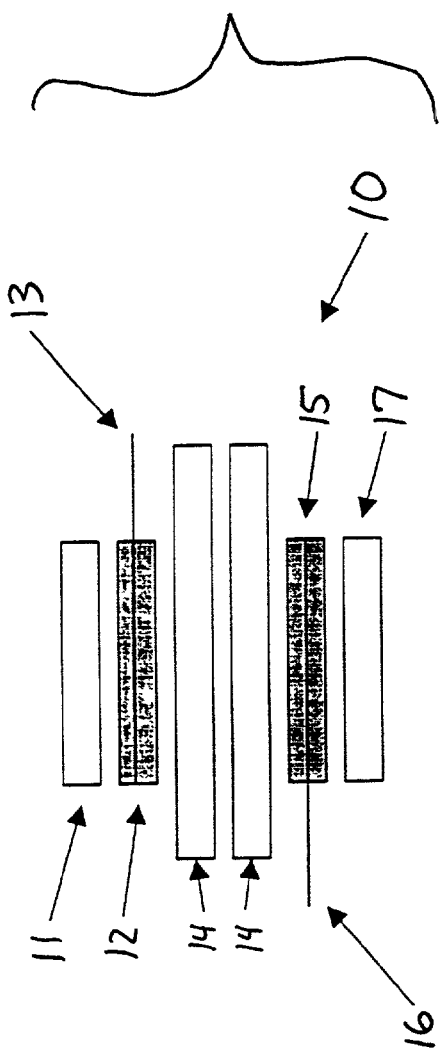

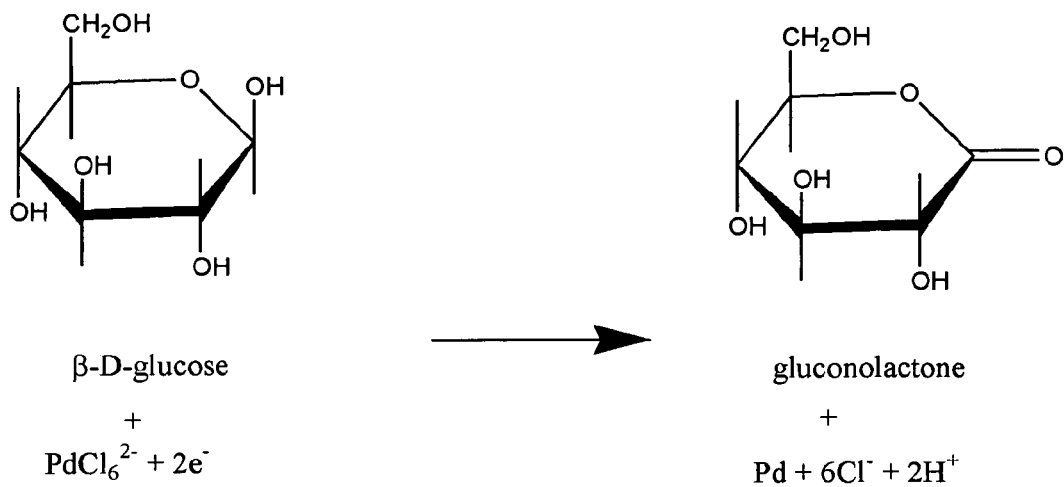
Figure 4. Chemical reduction of hexachloropalladate by glucose.
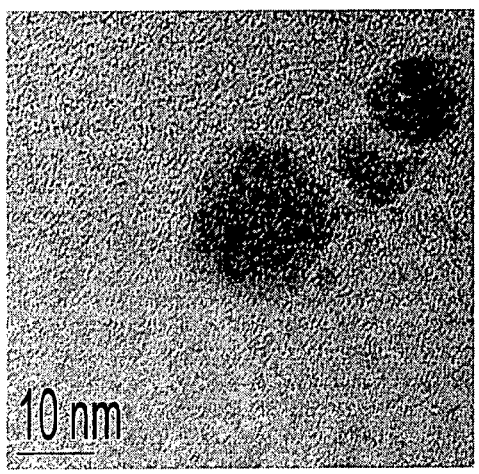
Figure 5. Particles of crystalline palladium formed in the bacterial cellulose matrix.

METALLIZATION OF BACTERIAL CELLULOSE FOR ELECTRICAL AND ELECTRONIC DEVICE MANUFACTURE

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

CROSS-REFERENCES TO RELATED APPLICATIONS

Not Applicable.

BACKGROUND OF THE INVENTION

1. Field of the Invention

This invention relates to a method for the deposition of metals in bacterial cellulose and the utilization of the metallized bacterial cellulose in the construction of fuel cells and other electronic devices.

2. Description of the Related Art

The production of bacterial cellulose (also referred to as microbial cellulose) from cellulose-synthesizing bacterium has been studied for over half a century. For instance, it was reported back in 1947 that in the presence of glucose and oxygen, resting cells of *Acetobacter xylinum* synthesize cellulose (see, S. Hestrin et al., "Synthesis of Cellulose by Resting Cells of *Acetobacter xylinum*", Nature 159: 64–65, 1947).

Through subsequent studies, it was determined that the physical properties of bacterial cellulose differ from those of the cellulose produced by green plants. Upon visual examination, it is evident that plant and bacterial cellulose differ in appearance and water content. Plant cellulose has a fibrous structure, while bacterial cellulose resembles a gel. In its hydrated state, the bacterial cellulose contains over a hundred times its weight in water. Yet both of these substances are built from the same basic unit, chains of glucose molecules that are linked by $\beta$-1,4-glycosidic bonds. The difference in the properties of these materials results from their nanoscale structural architecture. Cellulose that is synthesized by plants such as cotton (*Gossypium spp.*) and ramie (*Boehmeria nivea*) has a structure resembling a heavy-duty rope made of many small fibers twisted into larger fibers that are then twisted into the rope. Thirty-six glucose chains are assembled into an elementary fibril with a diameter of 3.5 nanometers. Microfibrils are assembled into macrofibrils that have a diameter ranging from 30 to 360 nanometers. The macrofibrils are then assembled into fibers. Imaging of cotton linter fibers by atomic force microscopy found an average macrofibril diameter of approximately 100 nanometers (see, Hon, "Cellulose: a random walk along its historical path", *Cellulose* 1:1–25 1994; and Franz et al. "Cellulose", in *Methods in Plant Biochem.* Vol. 2, Chapter 8, P. M. Dey and J. B. Harborne, editors, Academic Press, London, pages 291–322, 1990).

The most widely studied cellulose-synthesizing bacterium is *Acetobacter xylinus* (formerly *Acetobacter xylinum*, recently renamed *Gluconacetobacter xylinus* according to the American Type Culture Collection). In fact, this microorganism has been used for the production of the food product nata de coco in the Philippines. Cellulose is secreted by *Acetobacter* in the form of a twisted ribbon 40 to 60 nanometers wide that is extruded at a rate of 2 micrometers/minute. Each ribbon consists of 46 microfibrils, each of which has an average cross-section of 1.6×5.8 nanometers. These twisted ribbons, roughly corresponding to the macrofibrils of plant cellulose, assemble into sheets outside the cell, that combine to form a centimeter-thick layer called a pellicule on the surface of the culture medium. Scanning electron microscopy has revealed that, inside the pellicule, the fibrils are organized to form tunnels with a diameter of 7 micrometers, large enough for the bacteria to move through (see, S. Hestrin et al., "Synthesis of Cellulose by Resting Cells of *Acetobacter xylinum*", Nature 159: 64–65, 1947; S. Hestrin, et al., "Synthesis of cellulose by *Acetobacter xylinum*: Preparation of freeze-dried cells capable of polymerizing glucose to cellulose", *Biochem. J.* 58: 345–352, 1954; and Cannon et al., "Biogenesis of Bacterial Cellulose", *Crit. Reviews in Microbiol.* 17(6): 435–447, 1991).

The aforementioned nata de coco or coconut gel has been produced for domestic consumption in the Philippines for at least 100 years. Nata de coco is the gel-like cellulose pellicule formed on the surface of media by *Acetobacter xylinum* cultures. In recent years, it has become one of the most popular Filipino food exports. The export of nata de coco grew from $1.0 million in 1992 to $25.9 million in 1993, with 95% of the total going to Japan. Traditional production of nata de coco is carried out in the Philippines as a cottage industry. Fermentation of coconut milk and glucose medium inoculated with starter is carried out under static culture conditions, i.e., in square plastic containers 1.5 centimeters high. The fermentation broth is acidified by the addition of acetic acid. Typically, a fermentation time of 10 to 12 days at ambient temperature is required for production of a layer or pellicule 1 centimeter thick. The pellicules are washed with water and, in some cases, sodium hydroxide solution, then cut into 1 centimeter cubes. The cubes are generally soaked in sucrose solutions with addition of flavorings and colors for the food product (see, Technology and Livelihood Resource Center, Makati City, Philippines, available on the Internet at http://esprint.com.ph/cocosoy/mainpage/mainpage.html).

The unique properties of the bacterial cellulose synthesized by *Acetobacter* have inspired attempts to use it in a number of commercial products. These include tires (see, e.g., U.S. Pat. No. 5,290,830), headphone membranes (see, e.g., U.S. Pat. No. 4,742,164), paper (see, e.g., U.S. Pat. No. 4,863,565), and textiles (see, e.g., U.S. Pat. No. 4,919,753). Medical applications include a specially prepared membrane to be used as a temporary skin substitute for patients with large burns or ulcers (see, e.g., U.S. Pat. No. 4,912,049, and Fontana, et al., "*Acetobacter* Cellulose Pellicule as a Temporary Skin Substitute", *Appl. Biochem. Biotech.* 24/25: 253–264 12, 1990). A patent has also issued on the possible use of bacterial cellulose preparations as a source of dietary fiber (see, e.g., U.S. Pat. No. 4,960,763). Numerous patents have issued on the production of bacterial cellulose modified in some manner during cell growth or during processing (see, e.g., U.S. Pat. Nos. 5,079,162, 5,871,978, 6,060,289, 5,955,326, 5,962,277, 5,962,278, 6,017,740, and 6,071,727). It has also been reported that the addition of certain dyes to the culture medium inhibits the assembly of the pellicule sheets (see, Brown et al., "Experimental Induction of Altered Nonmicrofibrillar Cellulose", *Science* 218: 1141–1142, 1982), and that the addition of carboxymethylcellulose to the medium results in the formation of cellulose with special optical properties (see, e.g., U.S. Pat. No. 4,942,128).

In addition to studies directed to bacterial cellulose and it uses, others have studied the chemical reactions of cellulose more generally. For instance, various mechanisms of cellulose hydrolysis has been studied and reported on by Lassig, Shultz, Gooch, Evans and Woodward in "Inhibition of Cellobiohydrolase I from *Trichoderma reesei* by Palladium", *Arch. Biochem. Biophys.* 322: 119–126, 1995, and in "Palladium—a new inhibitor of cellulase activity", *Biochem. Biophys. Res. Comm.* 209: 1046–1052, 1995. As part of research studying the mechanism of cellulose hydrolysis, several metal ions and complexes were tested for inhibition of cellobiohydrolase I (CBH I), the β-1,4-glucan hydrolase comprising the major component of the cellulase mixture secreted by the fungus *Trichoderma reesei*. The most important contribution of CBH I to the hydrolysis of crystalline cellulose appeared to be the binding and disruption of the cellulose fibers. Specifically, a compound was sought that would inhibit hydrolysis of the β-1,4-glycosidic bond of the cellulose chains but would not effect binding to the crystalline cellulose. Sodium and ammonium hexachloropalladate were found to be the most effective inhibitors of the compounds screened. The hexachloropalladate inhibited hydrolysis of both small soluble substrates and crystalline, insoluble cellulose by CBH I, but did not inhibit binding of the enzyme to the insoluble cellulose.

For years, cellulose-containing products in general have also been studied for uses as an alternative source of fuel. For instance, the conversion of biomass to energy has been studied for some time. Increased use of cellulose-containing products in heat or electricity (power) generation systems would be particularly desirable as products which contain cellulose are a renewable resource. However, the use of bacterial cellulose in power generation systems has not been investigated.

One power generation system that has attracted widespread interest is the fuel cell. There are different types of fuel cells, but they each produce electrical energy by means of chemical reaction. One type of fuel cell is the polymer electrolyte membrane fuel cell which comprises a polymeric electrolyte membrane sandwiched between an anode and a cathode. The fuel cell generates electrical power by bringing a fuel into contact with the anode and an oxidant into contact with the cathode. The fuel is typically a hydrogen-containing material (for example, water, methane, methanol or pure hydrogen), and may be supplied to the fuel cell in liquid form or gaseous form, such as hydrogen gas. The fuel is introduced at the anode where the fuel reacts electrochemically in the presence of a catalyst to produce electrons and protons in the anode. The electrons are circulated from the anode to the cathode through an electrical circuit connecting the anode and the cathode. Protons pass through the electrolyte membrane (which is an electron insulator and keeps the fuel and the oxidant separate) to the cathode. Simultaneously, an oxygen-containing oxidant, such as oxygen gas or air, is introduced to the cathode where the oxidant reacts electrochemically in the presence of a catalyst consuming the electrons circulated through the electrical circuit and the protons at the cathode. The halfcell reactions at the anode and the cathode are, respectively: $H_2 \rightarrow 2H^+ + 2e^-$ and $\frac{1}{2}O_2 + 2H^+ + 2e^- \rightarrow H_2O$. The external electrical circuit withdraws electrical current and thus receives electrical power from the cell. The overall fuel cell reaction produces electrical energy which is the sum of the separate halfcell reactions written above.

While fuel cells are highly efficient electrochemical energy conversion devices that directly convert the chemical energy derived from renewable fuels into electrical energy, they do have disadvantages. Specifically, long felt needs generally exist to reduce initial costs and provide for inexpensive maintenance of fuel cell installations. The high cost of fabricating the fuel cells is due to many factors including (among other things) the high cost of synthetic polymeric materials used in the electrodes and the electrolyte membranes, the safety and environmental measures necessary for safe manufacture of the electrodes and electrolyte membranes, the difficulties in controlling the concentration of expensive catalysts, and the problems associated with the bonding of electrodes and the electrolyte membrane. Furthermore, it can be quite expensive to replace worn out fuel cells and recover the anode and cathode catalysts that may become fouled during operation. Also, fuel cell materials may not be amenable to recycling because of the presence of metal catalysts.

Therefore, there is a need for a fuel cell power generation system that can be fabricated from components that are inexpensive to manufacture and that can be readily recycled and recovered. In particular, it would be beneficial if these fuel cell components could be manufactured from a renewable resource such as a natural cellulose containing material.

SUMMARY OF THE INVENTION

The foregoing needs are met by a method according to the invention for the deposition of metals in bacterial cellulose and for the employment of the metallized bacterial cellulose in the construction of fuel cells and other electronic devices. In one aspect of the invention, there is provided a method for impregnating bacterial cellulose with a metal comprising placing a bacterial cellulose matrix in a solution of a metal salt for a sufficient time period such that the metal salt is reduced to metallic form and the metal precipitates in or on the matrix. The metal salt may be a coordination compound including a transition metal complex ion, and preferably, the metal salt is a coordination compound including a platinum metal group complex ion.

In a second aspect on the invention, there is provided a method for the construction of a fuel cell. In a first part of the method, a hydrated bacterial cellulose support structure is placed in a solution of a metal salt for a sufficient time period such that the metal salt is reduced to metallic form and the metal precipitates in or on the support structure. Typically, the metal salt is a platinum group metal coordination compound, such as a palladium coordination compound, and the concentration of metal in the support structure is controlled by the residence time of the support structure in the metal salt solution. Suitable contact wires are inserted in two pieces of the metal impregnated support structure, and the two pieces of metal impregnated support structure are then placed on opposite sides of a layer of hydrated bacterial cellulose. The three layer structure is then dehydrated to create a fuel cell. The resulting fuel cell has a dehydrated metal impregnated bacterial cellulose anode, a dehydrated bacterial cellulose electrolyte layer, and a dehydrated metal impregnated bacterial cellulose cathode. When the contact wires of the fuel cell are connected to an electrical circuit and the anode is contacted with a hydrogen-containing fuel, the fuel cell generates electricity as measured in the circuit. It has been discovered that the electrical current generated can be increased by pretreating the layer of bacterial cellulose forming the electrolyte layer with a metal salt and/or a sulfonated polymer before dehydration.

In a third aspect of the invention, there is provided a fuel cell electrode comprising a support structure comprising bacterial cellulose and a transition metal catalyst disposed in or on the support structure. In a fourth aspect of the invention, there is provided a method for recovering the catalyst from the fuel cell electrode comprising burning or hydrolyzing the support structure. In a fifth aspect of the invention, there is provided an electrolyte membrane for a fuel cell wherein the electrolyte membrane comprises a support structure comprising bacterial cellulose and a metal salt disposed in or on the support structure. In a sixth aspect of the invention, there is provided an electrolyte membrane for a fuel cell wherein the electrolyte membrane comprises a support structure comprising bacterial cellulose and a sulfonated polymer disposed in or on the support structure. In a seventh aspect of the invention, there is provided an enzyme electrode comprising a support structure comprising bacterial cellulose, a catalyst disposed in or on the support structure, and an enzyme disposed in or on the support structure.

It is therefore an advantage of the present invention to provide a method for the deposition of metals in bacterial cellulose and for the employment of the metallized bacterial cellulose in the construction of fuel cells and other electronic devices.

It is another advantage of the present invention to provide fuel cell electrodes and fuel cell solid electrolyte membranes that are formed from low cost precursors.

It is a further advantage of the present invention to provide fuel cell electrodes and fuel cell solid electrolyte membranes that are formed using low toxicity precursors, and low temperature and environmentally friendly processes.

It is yet another advantage of the present invention to provide a method for forming fuel cell electrodes and fuel cell solid electrolyte membranes that allows for greater control of the concentration of catalysts in the fuel cell electrodes and fuel cell solid electrolyte membranes.

It is still another advantage of the present invention to provide fuel cell electrodes and fuel cell solid electrolyte membranes including at least one catalyst wherein the catalysts may be easily recovered from the fuel cell electrodes and fuel cell solid electrolyte membranes.

It is a still further advantage of the present invention to provide lightweight fuel cell electrodes and lightweight fuel cell solid electrolyte membranes that may be assembled together without adhesives or glues.

BRIEF DESCRIPTION OF THE DRAWINGS

These and other features, aspects, and advantages of the present invention will become better understood upon consideration of the following detailed description, appended claims, and drawings where:

FIG. 1A is a schematic end view of a metallized cellulose cube having contact wires inserted therein;

FIG. 1B is a schematic perspective view of the metallized cellulose cube of FIG. 1A having the contact wires inserted therein;

FIG. 2 is a schematic side view of a fuel cell assembled from layers of metallized bacterial cellulose;

FIG. 4 is a graph showing the current versus time performance of a fuel cell having metallized bacterial cellulose electrodes separated by an untreated bacterial cellulose electrolyte layer, the fuel cell using acid displacement as the hydrogen source;

FIG. 5 is a graph showing the current versus time performance of a fuel cell having metallized bacterial cellulose electrodes separated by potassium chloride treated bacterial cellulose electrolyte layer, the fuel cell using acid displacement as the hydrogen source.

DETAILED DESCRIPTION OF THE INVENTION

Figure 3:
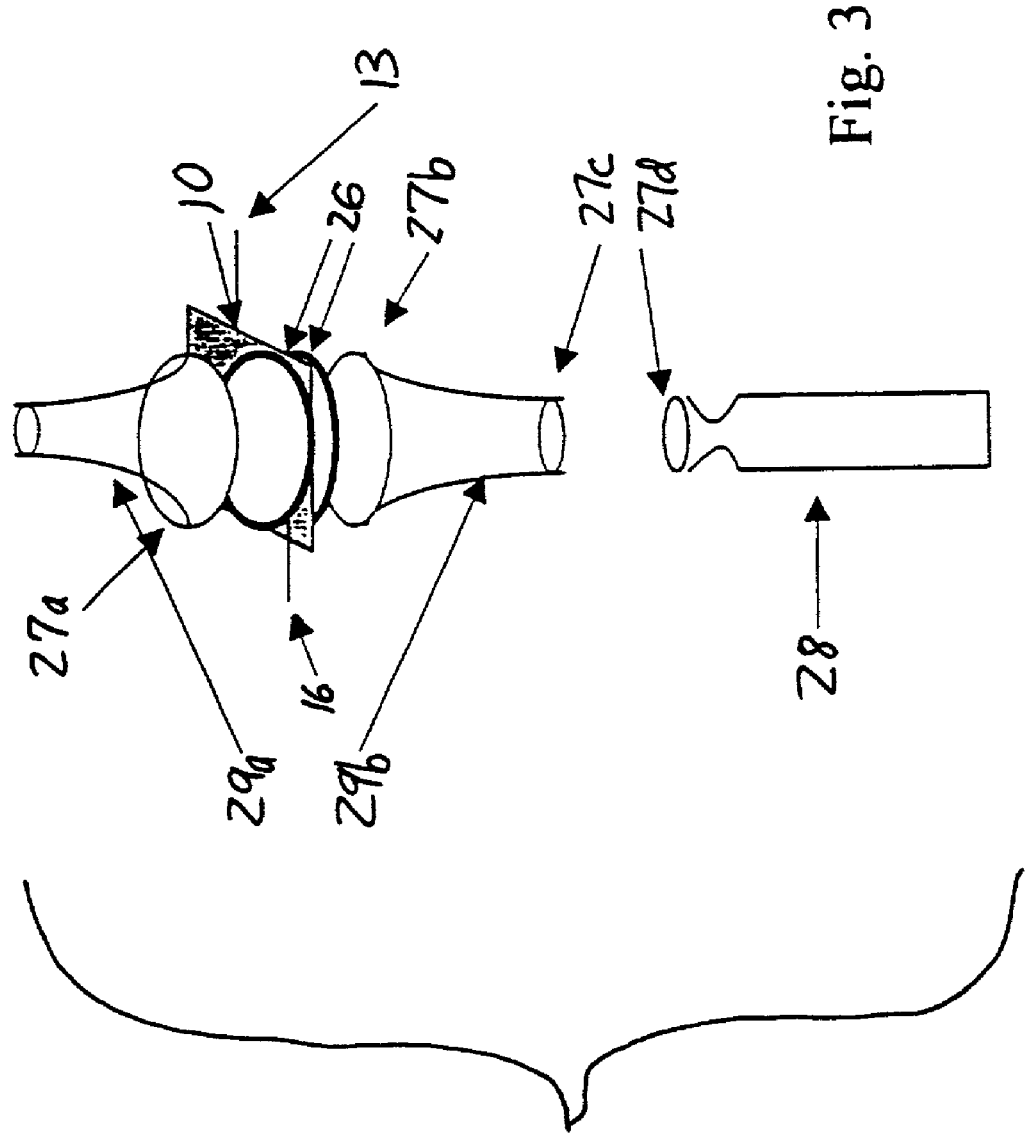
FIG. 3 is a schematic drawing of a fuel cell assembly used for testing the fuel cell of FIG. 2.

In a first aspect, the present invention provides a method for the deposition of metals in bacterial cellulose. The bacterial cellulose used in the method can be a bacterial cellulose matrix obtained by known methods. For example, the bacterial cellulose can be the Philippine food product nata de coco that is produced from coconut milk and sucrose by fermentation with a starter culture containing the bacterium *Gluconoacetobacter xylinus* (formerly *Acetobacter xylinum*) or related species. Alternatively, the bacterial cellulose can be produced by growing *Gluconoacetobacter xylinus* on media formulations that have been reported in the literature such as the Hestrin/Schramm medium described in U.S. Pat. No. 4,378,431 (i.e., 2.0%, w/v glucose, 0.5%, w/v peptone, 0.5% w/v yeast extract, 0.27%, w/v disodium phosphate, 0.11%, w/v citric acid with pH adjusted to 6.0 by dilute HCl or NaOH).

The matrix comprising bacterial cellulose is placed in a solution of a metal salt for a sufficient time period such that the metal salt is reduced to metallic form and the metal precipitates in or on the matrix. In one example embodiment, the metal salt is selected from coordination compounds including a transition metal complex ion, and mixtures thereof. In another example embodiment, the metal salt is selected from coordination compounds including a platinum metal group (i.e., ruthenium, osmium, rhodium, iridium, platinum and palladium) complex ion, and mixtures thereof. In yet another example embodiment, the metal salt is a coordination compound including a palladium complex ion. The metal loading in or on the bacterial cellulose matrix can be varied by controlling the amount of metal salt and the incubation time. Also, the co-precipitation of different metals can be achieved. After the selected incubation time has been reached, the matrix is removed from the solution and may be dried using a standard gel drier. The drying step causes the cellulose matrix to become dehydrated to a thin membrane, as the bacterial cellulose in its native hydrated form contains 100 to 200 times its weight in water.

Certain metal salts will be spontaneously precipitated by the bacterial cellulose whereas other metal salts will not be spontaneously precipitated by the bacterial cellulose. It has been discovered that if the metal salt is a coordination compound including a transition metal complex ion, the metal may or may not be spontaneously precipitated by the bacterial cellulose depending on the chemical stability of the metal salt. For example, when the metal salt is a coordination compound including a palladium complex ion, such as ammonium hexachloropalladate, spontaneous deposition of metallic palladium in the bacterial cellulose matrix diffused with ammonium hexachloropalladate is observed. In contrast, when the metal salt is a coordination compound including a platinum complex ion, such as ammonium hexachloroplatinate, spontaneous deposition of metallic platinum in the bacterial cellulose matrix may not be observed. However, the ammonium hexachloroplatinate may reduced by perfusion of hydrogen gas or other reductant into the bacterial cellulose matrix thereby allowing for precipitation of metallic platinum. In this manner, the deposition other metals in the bacterial cellulose may also be achieved, such as the precipitation of metallic gold from hexachloroaurate compounds diffused in bacterial cellulose.

It has been discovered that the metal impregnated bacterial cellulose can be used in a variety of applications. For example, in a second aspect of the invention, the metal impregnated bacterial cellulose is used in the construction of a fuel cell. In this second aspect of the invention, a hydrated bacterial cellulose support structure is placed in a solution of a metal salt to precipitate the metal as described above. Contact wires are then inserted in two pieces of the metal impregnated support structure, and the two pieces of metal impregnated support structure are then placed on opposite sides of a layer of hydrated bacterial cellulose. The three layer structure is then dehydrated to create a fuel cell. The resulting fuel cell has a dehydrated metal impregnated bacterial cellulose anode, a dehydrated bacterial cellulose electrolyte layer, and a dehydrated metal impregnated bacterial cellulose cathode.

Various methods are available for constructing a fuel cell in accordance with the second aspect of the invention. In a first version for constructing a fuel cell according to the invention, an electrode support structure comprising hydrated bacterial cellulose is first prepared using known methods for preparing bacterial cellulose such as those described above. The electrode support structure is then placed in a solution of a metal salt for a sufficient time period such that the metal salt is reduced to metallic form and the metal precipitates in or on the electrode support structure. Non-limiting examples of suitable metal salts include the coordination compounds listed above, and in particular, coordination compounds including a platinum metal group (e.g., platinum and palladium) complex ion, and mixtures thereof are quite useful. The metal loading in or on the electrode support structure can be varied by controlling the amount of metal salt and the incubation time. Also, the co-precipitation of different metals can be achieved. The electrode support structure is then removed from the solution of a metal salt, and at least two contacts are placed in the electrode support structure. One example of a suitable contact is an electrically conductive carrier such as a platinum wire.

The electrode support structure is then dehydrated to form an electrode material. One suitable instrument for dehydrating the electrode support structure is a standard gel drier designed to dry polyacrylamide or agarose gels. The dry electrode material is then divided into an anode and a cathode, each of which has at least one contact. A membrane support structure comprising hydrated bacterial cellulose is also prepared using known methods for preparing bacterial cellulose such as those described above. The anode is then placed on one side of the membrane support structure, and the cathode is then placed on an opposite side of the membrane support structure, thereby creating a three layer anode—membrane support structure—cathode structure. The membrane support structure is then dehydrated (such as by the gel drier) thereby affixing the anode and the cathode to the membrane support structure and forming a fuel cell. No adhesives are required to hold the multi-layered structure together as the hydrogen bonds between the cellulose fibrils are sufficient to keep the multi-layered structure intact. The resulting fuel cell has a dehydrated metal impregnated bacterial cellulose anode, a dehydrated bacterial cellulose electrolyte layer, and a dehydrated metal impregnated bacterial cellulose cathode. When the contact wires of the fuel cell are connected to an electrical circuit and the anode is contacted with a hydrogen-containing fuel, the fuel cell generates electricity as measured in the circuit. In particular, the halfcell reactions at the anode and the cathode are, respectively: $H_2 \rightarrow 2H^+ + 2e^-$ and $\frac{1}{2}O_2 + 2H^+ + 2e^- \rightarrow 43 H_2O$.

While the process steps in the first version for constructing a fuel cell according to the invention have been described in a specific order, it can be appreciated that a fuel cell can be prepared by undertaking the process steps in other sequences and with other variations of the individual process steps. For example, in a second version for constructing a fuel cell according to the invention, separate first and second electrode support structures are prepared from bacterial cellulose and then are separately placed in a solution of a metal salt for a sufficient time period such that the metal salt is reduced to metallic form and the metal precipitates in or on the first and second electrode support structures. Contact wires are then placed in each electrode support structure and the electrode support structures are dehydrated to form an anode and a cathode. The anode and the cathode may then be affixed to a membrane support structure as described above in the first version for constructing a fuel cell.

In a third version for constructing a fuel cell according to the invention, the electrode support structure may prepared from bacterial cellulose and then placed in a solution of a metal salt for a sufficient time period such that the metal salt is reduced to metallic form and the metal precipitates in or on the electrode support structure. The electrode support structure is then divided into a first portion and a second portion. Contact wires are then placed in each portion of the electrode support structure and the portions of electrode support structure are dehydrated to form an anode and a cathode. The anode and the cathode may then be affixed to a membrane support structure as described above in the first version for constructing a fuel cell.

In a fourth version for constructing a fuel cell according to the invention, the electrode support structure may prepared from bacterial cellulose and then placed in a solution of a metal salt for a sufficient time period such that the metal salt is reduced to metallic form and the metal precipitates in or on the electrode support structure. The electrode support structure is then divided into an anode portion and a cathode portion. Contact wires are then placed in each portion of the electrode support structure. The anode portion of the electrode support structure and a cathode portion of the electrode support structure are then placed on opposite sides of membrane support structure as prepared above and the anode portion, cathode portion and membrane support structure are simultaneously dehydrated to form a fuel cell.

In a fifth version for constructing a fuel cell according to the invention, separate first and second electrode support structures are prepared from bacterial cellulose and then are separately placed in a solution of a metal salt for a sufficient time period such that the metal salt is reduced to metallic form and the metal precipitates in or on the first and second electrode support structures. Contact wires are then placed in each electrode support structure. The first electrode support structure and the second electrode support structure are then placed on opposite sides of membrane support structure as prepared above and the first electrode support structure, the second electrode support structure and the membrane support structure are simultaneously dehydrated to form a fuel cell.

It has been discovered that the electrical current generated by a fuel cell according to the invention can be increased by pretreating the layer of bacterial cellulose forming the membrane support structure with a metal salt and/or a sulfonated polymer before dehydration. In a first version of this membrane pretreatment process step, a membrane support structure comprising hydrated bacterial cellulose is prepared using known methods for preparing bacterial cellulose such as those described above. The membrane support structure may then be placed in a solution of a metal salt for a sufficient time period such that the metal salt is deposited in or on the membrane support structure. Non-limiting examples of suitable metal salts include alkali metal salts, and in particular, alkali metal chlorides such as potassium chloride are quite beneficial. In a second version of this membrane pretreatment process step, a membrane support structure comprising hydrated bacterial cellulose is placed in a solution of a sulfonated polymer for a sufficient time period such that the sulfonated polymer is deposited in or on the membrane support structure. Non-limiting examples of suitable sulfonated polymers include perfluorinated sulfonic acid polymers such as those sold under trademark "Nafion", sulfonated poly(aryl ether ketones), sulfonated polyaromatic polymers such as those described in U.S. Pat. Nos. 3,528,858 and 3,226,361, and natural sulfonated polymers such as carrageenan. In a third version of this membrane pretreatment process step, a membrane support structure comprising hydrated bacterial cellulose is first placed in a solution of a sulfonated polymer for a sufficient time period such that the sulfonated polymer is deposited in or on the membrane support structure and then placed in a solution of a metal salt for a sufficient time period such that the metal salt is deposited in or on the sulfonated polymer and/or the membrane support structure.

The above-described methods for constructing a fuel cell according to the invention produce fuel cell electrodes and electrolyte membranes that are also advantageous when incorporated into other fuel cell configurations. In other words, the bacterial cellulose based electrodes and bacterial cellulose based electrolyte membranes do not necessarily have to be used together in the same fuel cell but can also be used with non-cellulose based electrodes and non-cellulose based electrolyte membranes. A fuel cell electrode is prepared according to the invention by impregnating bacterial cellulose with a transition metal catalyst (e.g., platinum or palladium), inserting an electronically conductive current carrier (such as a platinum group metal wire) into the bacterial cellulose, and dehydrating the bacterial cellulose. Co-precipitation of different transition metal catalysts can also be used to vary the catalytic properties of the electrode. A fuel cell electrode prepared in this manner has a current carrier (e.g., wire contact), a catalyst (e.g., palladium), and a proton transferring substrate (bacterial cellulose) and therefore, would be suitable for use as an anode and/or cathode with conventional solid electrolyte membranes. A fuel cell electrode prepared according to the invention is particularly advantageous as the catalyst can be recovered from the fuel cell electrode by burning or hydrolyzing away the cellulose using conventional methods and equipment. A fuel cell electrode prepared according to the invention using palladium also has advantageous hydrogen storage capability, and therefore has applications along these lines.

An electrolyte membrane is prepared according to the invention by impregnating bacterial cellulose with a metal salt (e.g., potassium chloride) and/or a sulfonated polymer (e.g., carrageenan) and dehydrating the bacterial cellulose. Typically, when a metal salt and a sulfonated polymer are used, the sulfonated polymer is infused throughout the cellulose, followed by soaking in the metal salt to load electrolyte ions on the sulfonate groups of the sulfonated polymer. An electrolyte membrane prepared in this manner has a proton transferring substrate (bacterial cellulose) and additional electrolytes (a metal salt and/or a sulfonated polymer) and therefore, would be suitable for use with conventional electrodes.

A fuel cell electrode prepared according to the invention can be further processed to produce an enzyme electrode. An enzyme electrode comprises, in most cases, an enzyme immobilized on an electrode as a base. When an oxidizable substance (e.g., glucose, lactose, cholesterol) is contacted with the enzyme (e.g., glucose oxidase, lactate oxidase, or cholesterol oxidase), an enzymatic reaction proceeds which gives an electrode current, and the electrode current changes depending on the amount of the oxidizable substance. The concentration of the oxidizable substance is determined by the change of the electrode current with reference to a previously formed calibration curve. Therefore, an enzyme electrode according to the invention can be prepared by depositing an enzyme in or on a fuel cell as prepared above.

EXAMPLES

The following examples are intended only to further illustrate the invention and are not intended to limit the scope of the invention which is defined by the claims.

Example 1

Preparation of Bacterial Cellulose

The bacterial cellulose used in the process was the Philippine food product nata de coco that is produced from coconut milk and sucrose by fermentation with a starter culture containing the bacterium *Gluconoacetobacter xylinus* (formerly *Acetobacter xylinum*) or related species. (In an alternative method, a similar cellulose product can be produced by growing *G. xylinus* on media formulations that have been reported in the literature such as the Hestrin/Schramm medium described in U.S. Pat. No. 4,378,431).

Example 2

Incubation of Bacterial Cellulose Cubes with Palladium

Bacterial cellulose cubes were incubated with ammonium hexachloropalladate dissolved in 50 mM sodium acetate pH 4.5 at 38° C. This resulted in the precipitation of palladium metal throughout the bacterial cellulose The palladium metal precipitation began within 30 minutes of the start of incubation and was allowed to continue for 18 to 24 hours, after which time the cubes were completely black in appearance. This material, consisting of cellulose impregnated with palladium particles, is referred to herein as "palladium-cellulose". Analysis of the hexachloropalladate ion remaining in solution indicated 30% of total added had precipitated in or on the bacterial cellulose. Incubation of the bacterial cellulose cubes in a solution of ammonium hexachloropalladate dissolved in HPLC-grade water increased the amount of palladium precipitated in the cubes to 50% of the total hexachloropalladate added. The amount of palladium in the cellulose cubes increased as the concentration was increased from 5 to 10 mM, but the fraction of palladium precipitated per hexachloropalladate added was the same for each solution. Reduction of the hexachloropalladate metal complex to metal particles occurred spontaneously. Without intending to be bound by theory, it appears that the reduction of the hexachloropalladate metal complex to metal particles is carried out by the reducing ends of the cellulose chains comprising the bacterial cellulose.

Example 3

Incubation of Bacterial Cellulose Cubes with Platinum

For platinization of the cellulose, ammonium hexachloroplatinate is first loaded into the cubes by diffusion during overnight incubation as described for palladium in Example 2. The hexachloroplatinate is not spontaneously reduced inside the cellulose, but is reduced by perfusion of hydrogen gas (or other reductant) into the cellulose matrix. Because hexachloroplatinate is more stable than the corresponding palladium salt, it is believed that this makes it more resistant to reduction by the reducing ends of the cellulose fibrils. Precipitation of hexachloroaurate has also been demonstrated in bacterial cellulose.

Example 4

Dehydration of Metal Impregnated Bacterial Cellulose Cubes

The cubes of cellulose containing precipitated metal were rapidly dried under vacuum using a standard gel drier designed to dry polyacrylamide or agarose gels. The drying step caused the cellulose cubes or sheets to become dehydrated to a thin membrane, as the bacterial cellulose in its native hydrated form contains 100 to 200 times its weight in water. For assembly of multilayer devices, the pretreated cubes are dried sequentially, by placing a hydrated cube on top of the previously dried cube, then applying vacuum. No adhesives are required to hold the multi-layered structures together. The hydrogen bonds between the cellulose fibrils are sufficient to keep the multi-layered structure intact.

Example 5

Construction of a Membrane Electrode Assembly

A membrane electrode assembly suitable for use in a fuel cell was constructed by layering catalyst and insulator layers. The palladium-cellulose layers act as the catalyst for the two half-reactions of the fuel cell. To prepare an insulating layer, a cube of untreated bacterial cellulose was dehydrated on the gel dryer for 30 seconds to dry to a thin membrane. Catalyst membranes are prepared by insertion of platinum wires into a hydrated metallized cube before drying. The construction of the catalyst membranes is schematically shown in FIGS. 1A and 1B. To prepare a catalyst layer, four platinum wires (two anode wires 13 in FIGS. 1A and 1B and two cathode wires 16 in FIGS. 1A and 1B) with a diameter of 0.1 millimeters were inserted into a cube of palladium-cellulose at regular intervals. The palladium-cellulose cube catalyst layer with the inserted wires was placed on top of the insulating layer and the drying process was repeated. The untreated insulating layer of bacterial cellulose serves to protect the palladium-cellulose layer from the external environment. The resulting structure was trimmed along the edges to ensure that the catalyst and insulating layers were identical in size. This layered membrane assembly was then cut in half, so that each half contained two platinum wires. The layered membranes are depicted in FIGS. 1A and 1B. The dashed line in FIGS. 1A and 1B indicates a parting line between an anode 12 and an anode protective layer 11, and a cathode 15 and a cathode protective layer 17. These two pieces are the cathode and anode of the fuel cell. A layered membrane electrode assembly is shown in FIG. 2. Looking at FIG. 2, two layers of unmodified bacterial cellulose (element 14 in FIG. 2) were used to separate the catalyst layers in a fuel cell 10, as cellulose is a good insulator and prevents electron flow between the catalyst layers. Protons can permeate through the cellulose layers, and the platinum wires complete the circuit. An additional layer of bacterial cellulose was added to protect the catalyst layer from the environment.

Example 6

Assembly of Fuel Cell from the Membrane Electrode Assembly

The membrane electrode assembly was used as part of a fuel cell that was placed in a small hydrogen generator assembly to test for current production. The assembly is depicted in FIG. 3. The assembly includes two glass fittings 29a and 29b with O-ring joints 27a and 27b. The fuel cell 10 of FIG. 2 was sandwiched between two O-rings 26 that also contact the O-ring joints 27a and 27b of the glass fittings 29a and 29b. A reaction vessel 28 including O-ring joint 27c was fitted against O-ring joint 27d of the bottom glass fitting 29b. Hydrogen was generated in the reaction vessel 28 using metal displacement or electrolysis. The platinum wires 13 and 16 were attached to an autoranging picoammeter that was interfaced with a computer running a data collection program sold under the trademark "Labview" for continuous on-line monitoring of current production. Current production was monitored for at least 24 hours to test each fuel cell configuration. In FIG. 4, there is shown a plot of current production (electrical production) in microamps versus time (hours) for the fuel cell configuration having untreated dehydrated bacterial cellulose as the electrolyte layer and acid displacement (Fe/acetic acid reaction) as the hydrogen source. A control experiment was also carried out to confirm that the current measured was not a result of $H_2$ oxidation on the platinum wires.

Example 7

Construction of an Alternative Membrane Electrode Assembly

An alternative electrolyte layer was prepared in an effort to increase the performance of the fuel cell. As in Example 5, a membrane electrode assembly suitable for use in a fuel cell was constructed by layering catalyst and insulator layers. The palladium-cellulose layers act as the catalyst for the two half-reactions of the fuel cell. The insulating layer was prepared by dehydrating a cube of untreated bacterial cellulose on a gel dryer for 30 seconds to dry to a thin membrane. Catalyst membranes were prepared by insertion of platinum wires into a hydrated metallized cube before drying. The catalyst layer was prepared by inserting four platinum wires with a diameter of 0.1 millimeters into a cube of palladium-cellulose at regular intervals. The palladium-cellulose cube catalyst layer with the inserted wires was placed on top of the insulating layer and the drying process was repeated. The untreated insulating layer of bacterial cellulose serves to protect the palladium-cellulose layer from the external environment. The resulting structure was trimmed along the edges to ensure that the catalyst and insulating layers were identical in size. This layered membrane assembly was then cut in half, so that each half contained two platinum wires. The layered membranes are depicted in FIGS. 1A and 1B. These two pieces are the cathode layer and the anode layer of the fuel cell.

An electrolyte layer was then prepared by infusing a cube of untreated bacterial cellulose with 1 M potassium chloride (KCl) for at least 24 hours. The KCl-treated bacterial cellulose was then dried between the anode and cathode layers for 10 minutes on the gel-dryer to create a membrane electrode assembly. The physical characteristics of the fuel cell were as follows in Table 1.

TABLE 1

| | |
|---|---|
| Surface area | 4.0 cm² |
| Area of Catalyst layer | 1.53 cm² |
| Area of Catalyst layer exposed to $H_2$ | 1.1 cm² |
| Palladium loading | 1 mg/catalyst layer |
| Surface area of electrodes in contact with catalyst | 0.05 cm² |
| Weight of fuel cell | 126 mg (Approx. weight of Pt wires is 100 mg) |
| Operating temperature | 26° C. |

The membrane electrode assembly was used as part of a fuel cell that was placed in a small hydrogen generator assembly to test for current production as in Example 6 above. Current production was monitored for at least 24 hours to test the fuel cell configuration. The performance of the fuel cell was tested using three different $H_2$ sources: acid displacement reaction, a 4% $H_2$/96% Ar gas mixture, and 100% $H_2$. Open circuit current and voltage measurements of the fuel cells were taken and are shown in Table 2.

TABLE 2

| $H_2$ source | Reaction Conditions | Current ($\mu$A) | Voltage (V) |
|---|---|---|---|
| Acid displacement | Fe/acetic acid reaction. The reaction was under pressure due to the build up of $H_2$ in the vessel | 192 | 0.483 |
| 4% $H_2$/96% Ar | atmospheric pressure, 71.6 mmol $H_2$/min | 25 | 0.442 |
| 100% $H_2$ | atmospheric pressure, 1.78 mol $H_2$/min | 36 | 0.273 |

Figure 6:
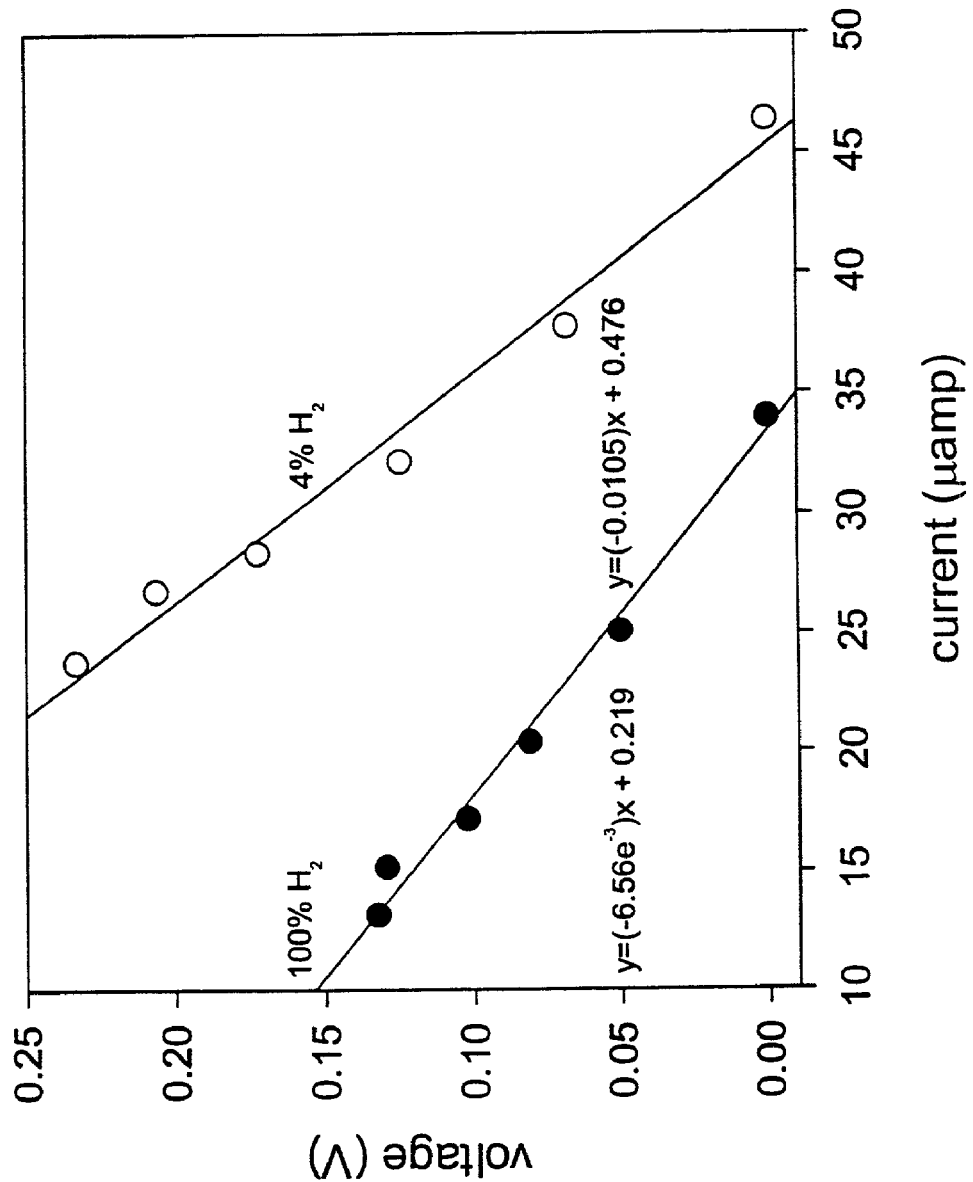
FIG. 6 is a graph showing the voltage versus current performance of a fuel cell having metallized bacterial cellulose electrodes separated by potassium chloride treated bacterial cellulose electrolyte layer, the fuel cell using acid displacement as the hydrogen source.

In FIG. 5, there is shown a plot of current production (electrical production) in microamps versus time (hours) for the fuel cell configuration having KCl-treated dehydrated bacterial cellulose as the electrolyte layer and acid displacement (Fe/acetic acid reaction) as the hydrogen source. Voltage and current values for the fuel cell using the 4% $H_2$/96% Ar gas mixture and the fuel cell using 100% $H_2$ were also measured. In this test, the resistance was increased in 2 kilo-ohm increments from 1 kilo-ohm to 11 kilo-ohm. The testing was carried out at 28° C. and atmospheric pressure, and the gas flow rate was 40 milliliters per minute. The plot of voltage versus current for the fuel cell using the 4% $H_2$/96% Ar gas mixture and the fuel cell using 100% $H_2$ are shown in the graph of FIG. 6.

Example 8

Construction of Another Alternative Membrane Electrode Assembly

Another alternative electrolyte layer was prepared in an effort to increase the performance of the fuel cell. This type of electrolyte membrane was prepared by first soaking the bacterial cellulose in K-carrageenan to infuse the sulfated polysaccharide throughout the cellulose layer, followed by soaking in potassium chloride to load electrolyte ions on the sulfonate groups of the K-carrageenan. This membrane was used as the electrolyte membrane in a fuel cell construction in the same manner as the KCl-impregnated cellulose described above in Example 7. The fuel cells constructed with the potassium chloride-carrageenan membranes were tested as in Example 7 and gave test results in the production of current from hydrogen similar to those obtained with the KCl-cellulose membrane.

Thus, there has been provided a method for the deposition of metals in bacterial cellulose and for the employment of the metallized bacterial cellulose in the construction of fuel cells and other electronic devices. The methods have several advantages. First, metal salts can be infused into the bacterial cellulose matrix, reduced to metallic form, precipitated inside the cellulose, and then concentrated by drying without the use of toxic solvents or caustic solutions. Second, the metal loading on the bacterial cellulose matrix can be varied by controlling the amount of metal salt and incubation time. Third, the bacterial cellulose is capable of absorbing small inorganic molecules and large biomolecules, and therefore, it is easy to alter the properties of the bacterial cellulose by infusing in the desired reagent prior to drying. For example, proton or electronic conducting properties can be conferred on the bacterial cellulose by addition of the appropriate electrolyte, and the properties of the bacterial cellulose can also be changed by chemical modification of functional groups on the cellulose fibrils, such as by sulfonation of the bacterial cellulose to produce a material with proton conducting properties. Fourth, assembly of a fuel cell can be achieved by sequential drying of treated and/or untreated cellulose layers, with no requirement for glues. Fifth, the untreated and treated bacterial cellulose is stable to autoclaving (120° C. and 20 psi.), and therefore the untreated and treated bacterial cellulose is a versatile material that can be used for low temperature (20–80° C.) and mid range temperature (80–150° C.) fuel cells. Sixth, for fuel cell applications, the low cost, lightweight, and low toxicity of the dehydrated untreated and treated bacterial cellulose are seen as major advantages compared to other methods. Seventh, the recovery of the catalyst (e.g., palladium) from the fuel cell electrodes and membranes is quite simple, as the cellulose portion can be burned or hydrolyzed away from the metals using conventional methods and equipment. Other advantages would be apparent to those skilled in the art.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

We claim:
1. A fuel cell comprising:
an electrolyte membrane comprising a membrane support structure comprising bacterial cellulose;
an anode disposed on one side of the electrolyte membrane; and
a cathode disposed on an opposite side of the electrolyte membrane,
wherein at least one of the anode and the cathode comprises an electrode support structure comprising bacterial cellulose, and a metal catalyst disposed in or on the electrode support structure, the metal catalyst being disposed in or on the electrode support structure by placing the electrode support structure in a solution of a metal salt for a sufficient time period such that the metal salt is reduced to metallic form and the metal catalyst precipitates in or on the electrode support structure, and wherein each anode or cathode comprising an electrode support structure comprising bacterial cellulose is held together to the electrolyte membrane by hydrogen bonds.

2. The fuel cell of claim 1 wherein:

the catalyst is selected from platinum group metals.

3. The fuel cell of claim 1 wherein:

the catalyst is palladium.

4. The fuel cell of claim 1 wherein:

a metal salt is disposed in or on the membrane support structure.

5. The fuel cell of claim 1 wherein:

a sulfonated polymer is disposed in or on the membrane support structure.

6. The fuel cell of claim 1 wherein:

the electrode support structure is dehydrated after the metal catalyst is disposed in or on the electrode support structure.

7. The fuel cell of claim 1 wherein:

the membrane support structure is dehydrated.

8. The fuel cell of claim 1 wherein:

the anode and the cathode comprise an electrode support structure comprising bacterial cellulose, and a catalyst disposed in or on the electrode support structure.

9. The fuel cell of claim 1 wherein:

the metal salt is a coordination compound including a platinum metal group complex ion.

10. The fuel cell of claim 8 wherein:

the anode is held together to the electrolyte membrane by hydrogen bonds and the cathode is held together to the electrolyte membrane by hydrogen bonds.

* * * * *

UNITED STATES PATENT AND TRADEMARK OFFICE
CERTIFICATE OF CORRECTION

PATENT NO. : 6,986,963 B2
DATED : January 17, 2006
INVENTOR(S) : Barbara R. Evans et al.

It is certified that error appears in the above-identified patent and that said Letters Patent is hereby corrected as shown below:

Column 10,
Line 49, "cellulose The" should be -- cellulose cube. The --.

Signed and Sealed this

Twenty-third Day of May, 2006

JON W. DUDAS
*Director of the United States Patent and Trademark Office*